United States Patent [19]

Pierson

[11] Patent Number: 5,076,708
[45] Date of Patent: Dec. 31, 1991

[54] THREADED TEMPERATURE INDICATING PLUG FOR HOT OIL HOUSINGS SUCH AS TRANSMISSIONS AND THE LIKE

[76] Inventor: Mark W. Pierson, 316 Bradley St., Saco, Me. 04072

[21] Appl. No.: 523,861

[22] Filed: May 14, 1990

[51] Int. Cl.$^5$ .................. G01K 1/02; G01K 11/12
[52] U.S. Cl. .................. 374/144; 123/196 AB; 374/162; 411/13
[58] Field of Search .......... 374/162, 144; 116/216, 116/212; 411/13, 14; 123/196 AB

[56] References Cited

U.S. PATENT DOCUMENTS

| | | | |
|---|---|---|---|
| 1,374,857 | 4/1921 | Linebarger | 374/161 |
| 2,925,576 | 2/1960 | Wakeland et al. | 411/14 X |
| 3,260,112 | 7/1966 | Godbey et al. | 374/162 X |
| 3,651,695 | 3/1972 | Brown | 374/162 X |
| 3,864,976 | 2/1975 | Parker | 374/161 |
| 3,877,411 | 4/1975 | MacDonald | 374/162 |
| 3,987,668 | 10/1976 | Popenoe | 411/13 X |
| 4,679,432 | 7/1987 | Draeger | 73/295 |
| 4,909,685 | 3/1990 | Hirst | 411/14 X |

FOREIGN PATENT DOCUMENTS 0372494 3/1923 Fed. Rep. of Germany ...... 374/162

Primary Examiner—Daniel M. Yasich
Attorney, Agent, or Firm—Laforest S. Saulsbury

[57] ABSTRACT

A threaded temperature indicating plug for hot oil containing housings such as vehicle transmissions and the like that can replace the standard oil level plugs of the same and as well afford a plug that from which the temperature at which the oil may have overheated will be recorded and whether there is a definite need to change the oil in the transmission. Liquid crystal areas are provided on an indicator label that is fixed to the plug bolt shank in a liquid-tight manner by a fixed covering and for direct contact with the oil body or a splash from oil at a lowered level.

3 Claims, 1 Drawing Sheet

THREADED TEMPERATURE INDICATING PLUG FOR HOT OIL HOUSINGS SUCH AS TRANSMISSIONS AND THE LIKE

This invention relates to a temperature indicator for use with automobile transmissions and like hot oil container housings from which determination of the condition of lubricating oil can be had by simple removal of the oil level bolt from the transmission housing and reading a temperature indication thereon.

Heretofore, the condition of the lubricating oil in the transmission has been determined from finger working a sample of the oil taken from the transmission after removal of the level plug and felt out to see if the oil has become thinned from use and overheating but without having a registration of high temperature to which the oil may have been subjected during continued use. On occasions, such determination for accuracy is dependent wholly upon the expertise of the mechanic. He will not know whether this breakdown has resulted from the overheating or just the repeated use of oil, the oil level and mere passage of time generally tells him if a change is needed. Heavy overheating in using the oil can happen anytime without knowledge of what has taken place. There is a limit to what overheating the oil can stand and such data should be available to avoid any question independently of a low level and a mere fingering of the oil. Upon checkup of the vehicle transmission, the level plug bolt is removed to see if there is need for additional oil and by fingering the sample and oil is simply added without having known as to whether the oil has been overheated at any time and without knowledge of the normal working temperature of the oil within the transmission.

In accordance with the present invention, a liquid crystal color changeable temperature indicating label arrangement is placed upon the oil level bolt plug itself of the transmission so that when the plug is removed to examine the level of this oil and its condition by fingering, a reading can be taken off this bolt plug as to any of several temperatures that this oil has been subjected and any high limit of overheating as well as lower settings that may have been reached and all readable from any or or series of several discolored areas on the label tightly encased upon the bolt plug shank. The various colored areas of the label respectively respond to different degrees of heat and are underlined by markings of the temperatures reached, the same running from low to high limits. While the indicator has found application for use with level determining bolt plug of vehicle transmission where the shank of this bolt is thrust into the body of oil, the bolt plug with the temperature responsive areas on the shank can be used with other hot oil and gear box housings filled with an oil body and restricted within their housings. There is no dependency of temperature upon the bolt itself for indication as the shank of this bolt is extended into the fluid body confined within the housing space. The bolt plug is of standard shape and the indicating areas are not dependent upon heat transfer through the body of the bolt metal to produce indication. To display temperatures of different degrees is provided by the use of several gradient heat responsive areas on a paper sheet that is wrapped about the shank of the bolt plug. The splashing from low level oil body can also discolor the liquid crystal indicating areas.

In U.S. Pat. No. 3,877,411 temperature indication is dependent upon heat transfer through the metal bolt shank body to a solitary color sensitive paper on the bolt head that lies outside the housing and not on the shank of a screw bolt that is inside the housing and in the oil body. Transmissions and differentials on heavy equipment are subject to failure of lubricating oil and resultant break up of their bearings and gears. Lubricant temperatures increase and take place well in advance of the failure. Failure results by temperature rise in the oil caused by worn bearings and gears, overloading of the gear box, low lubricant level and improper gear clearances. To help overcome this failure, manufacturers have installed thermocouples to alert the operator of potential breakdown. Such systems are expensive and impractical for small equipment.

The present level bolt plug temperature indicator is inexpensive compared with thermocouple systems since it has no moving or electrical parts to fail. Liquid crystal temperature labels have been used in dry protected areas but has here been adapted for use in liquids. In the present device, use has been made of a liquid level bolt plug that is standard on gear box equipment. This level bolt plug has been altered to enclose a liquid crystal paper label on its shank so as to be submerged in the liquid oil itself and kept in an always dry manner responsive to heat passing through the thickness of its enclosing shell and will withstand any severe vibration to which such equipment is subjected.

Other temperature indicating devices have monitored the oil from outside the housing and in ways in which the temperature sensing material is not put in close proximity with the fluid itself within the housing that is desired to be monitored. The indicating label of the Sprig U.S. Pat. No. 4,459,046 has been fashioned to have several different heat responsive areas that are respectively discolored by different temperatures. The packaging of the liquid crystal areas upon the shank of this present oil level bolt is such as to be impervious to the lubricating oil and provide a short path thereto. The standard level bolt plug provides a most suitable and logical way to locate the temperature areas so as to be submerged or splashed by the oil during operation of the transmission. The liquid crystal indicator sheet is installed in the plug. Each heat sensitive area darkens when harmful high temperatures of the oil are reached leaving the darkened indicating area on the plug so that when it is removed, one will know how hot the oil has been over a period of different times and the working temperature of the oil. The mechanic usually feels the oil to determine the thickness of body the oil, but it is a hit and miss procedure without being given any showing as to how hot the oil has ever been at times. The present device tells whether the oil has ever been overheated and by simple examination of the indicating areas one will learn the temperatures at which overheating took place. If it was a maximum overheating the oil should be changed.

It is the principal objective of the present invention to provide a simple temperature indicator for hot fluid containing housings such as vehicle transmissions and differentials to determine temperatures to which the oil within their housing has been subjected at various times and the highest extent of this heating.

It is another object of the invention to incorporate such a temperature indicator in liquid level standard bolt plugs of transmissions and differentials which upon removal for checking the oil level will at the same time provide a tell-tale of oil temperatures which have been reached when in operation and whether the oil has been overheated above a critical point and burned out of its lubricating qualities since the last check up.

It is another object of the invention to provide a package structure for assembling a liquid crystal label upon the shank of an oil level plug that will maintain the label in a dry state while submerged in lubricant of the gear box transmission or differential with a short heat transfer path to the liquid crystal independently of the heated metal shank body of the level bolt plug.

Other objects of the invention are to provide a liquid crystal temperature indicator for transmissions and differentials, having the above objects in mind, which is of simple construction, inexpensive to manufacture, has a minimal number of parts, easy to assemble upon a liquid level bolt plug, easily readable upon the oil level bolt plug being removed, without movable parts, effective and efficient in operation.

For a better understanding of the invention, reference may be had to the following detailed description taken in connection with the accompanying drawing, in which.

Figure 1:
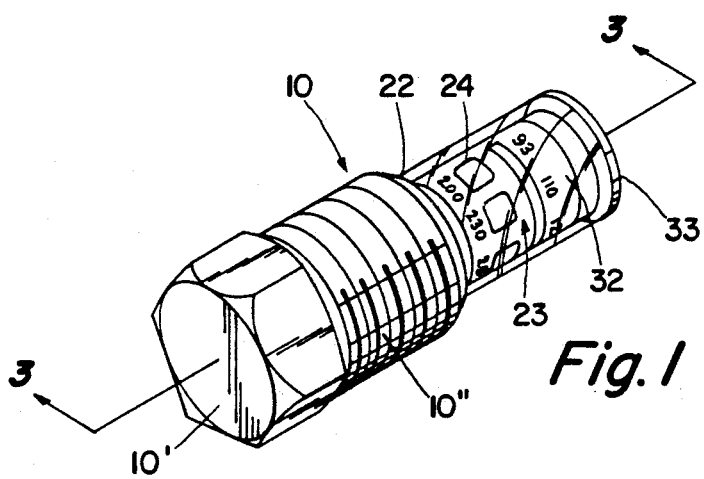
FIG. 1 is a perspective view of the oil temperature indicating bolt plug for use with transmission and differential housings and embodying the features of the present invention.
Figure 2:
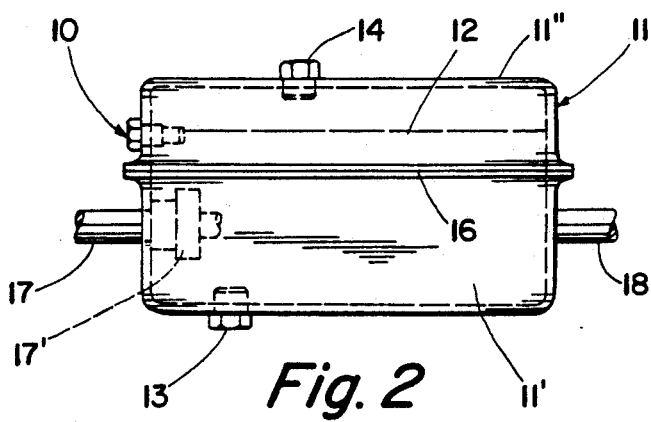
FIG. 2 is a side elevational view of a vehicle gear box transmission showing the normal location of filler, drain and oil level plugs.
Figure 4:
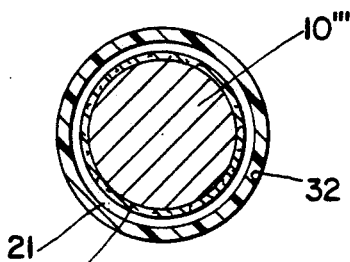
FIG. 4 is a full cross-sectional view of the plug taken through the bolt plug shank on line 4—4 of FIG. 3.
Figure 3:
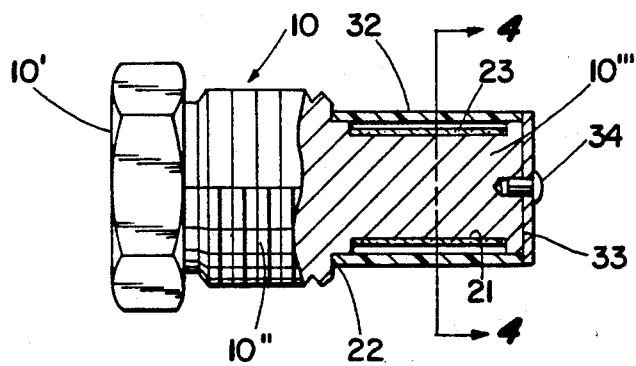
FIG. 3 is a fragmentary longitudinal sectional view taken generally on line 3—3 of FIG. 1.
Figure 5:
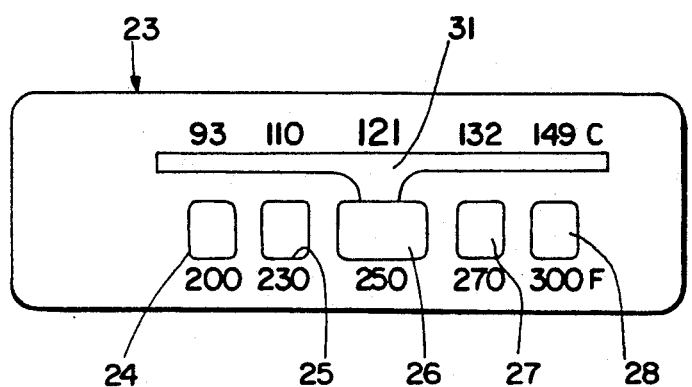
FIG. 5 is a enlarged layout view of the label bearing the various liquid crystal areas respectively responsive to different gradient temperatures marked off in both Centigrade and Fahrenheit scales and discolored upon the oil lubrication reaching the indicated temperatures.

Referring now to the Figures, 10 represents an oil level bolt plug of a size normally located in an end of a transmission housing 11 containing lubricating oil at a level indicated at 12 and that has been fashioned into a temperature indicating plug embodying the features of the present invention. This plug 10 is normally removed to determine the need for lubricating oil and at the time when re-filling of the transmission is made. Prior to refilling, drain plug 13 will have been removed to drain the oil and the plug put back in place. For the filling operation, while the level temperature plug 10 is still removed, filler plug 14 is removed and oil is poured until the oil level 12 is reached. Thereupon, the level and the filler plugs are threaded back upon the transmission housing 11 and the transmission is made ready for further use.

The transmission housing 11 comprises bottom and top housing parts 11' and 11" secured together by their flanges as indicated at 16. Within the housing 11 will be the usual gearing assembly 17 which if faulty or worn will generate heat that is destructible and harmful to the lubricating oil, all in a manner known to users of transmissions and gear equipment. The transmission 11 has respective power input and output shafts 17 and 18.

The standard oil level bolt plug has been replaced by this temperature indicating plug 10 that is fashioned as an ordinary bolt plug having a head 10' and a long partially threaded shank 10". This bolt 10 will serve both as an oil level plug and a temperature indicator.

The shank 10" is threaded for a part of its length and sufficient to have an adequate leakproof connection with transmission housing.

The remaining part of the shank is reduced in diameter to have a shank extension or unthreaded portion 10''' free of the threads of the partially threaded portion 10" and that is grooved at 21 and shouldered at 22. The round surface of extension 10''' is grooved throughout its major extent to receive a paper label 23 that is wrapped thereabout which bears a series of liquid crystal areas 24, 25, 26, 27 and 28 that will be discolored respectively by different degrees of heat and indicated with both Fahrenheit and Centigrade markings. Such labels are distributed under registered trademarks Markal and Hermet and function much as set forth in U.S. Pat. Nos. 4,459,046 and 4,538,926. Above the crystal areas 24–28 is a mere spread of printing 31 having no function with corresponding Centigrade markings there above that are respectively aligned with the respective Fahrenheit markings when the corresponding degrees of heat are destructible to the lubricating oil within the transmission housing. A transparent plastic sleeve enclosure 32 is tightly fitted over the label 23 and extension 10''' through which the discoloring of the areas can be noted. The enclosing sleeve 32 must be of heat resistent material incapable of breakdown at the high working temperatures of the transmission and of the oil therein.

The rounded attaching surface of the bolt shank permits the laying of the indicating areas over a rounded surface, so that light rays will not be reflected and the discoloring of the areas may be more easily read. With separate and spaced areas that are used, each for a different temperatures rather than one graduated solid area, the readings will be more distinct. Thus, a keen reading of a series of working and overheating temperatures will be recorded. The liquid crystal coatings of heat effected areas are all provided in a paper like label sheet wrapped about the bolt shank and not directly connected to the metal plug body and not dependent upon the heat transfer from the plug body itself. The substance of the heat effected areas once discolored do not reverse and thus leave definite signals of the respective temperatures that were reached. With highest temperatures having been reached and all areas having become discolored there is definite indication that overheating has taken place and that change of oil should be made.

In a prior U.S. Pat. No. 3,877,411, there is shown a headed bolt that carries upon its head a solitary disc adhesively impregnated with a chemical substance that changes color at a given temperature. The heat transfer to the disc is through the bolt body and hot directly from an oil body. With the present indicator, once the area has been discolored it stays that way thereby leaving an indication for the mechanic as to how hot the transmission may have run and to the exact temperature that the oil has been subjected.

The actual label 23 is one inch long to be accomodated in a similar size groove 21 in the shank extension 10'''. The tight fitting transparent plastic sleeve 32 is made of plastic material that withstands the high temperatures of a transmission and remains visible for reading the discolored areas. The inner end of the enclosure sleeve 32 abuts the shoulder 22 and is retained tightly in place by a circular end plate 33 that is secured to the outer end of the extension 10''' by a centrally located fastening rivet 34.

With this assembly thus complete and the plug 10 threaded into the transmission housing the shank extension will lie well therewithin so as to be submerged in this hot oil 12 and splashed with the oil if the oil level has been lowered. The plastic sleeve 32 and liquid crystal areas 24-28 will be in direct contact with the hot oil and there is no dependence made of the metal body of the bolt for transfer of heat for activation.

It should now be apparent that a step has been taken to further the protection of transmissions and gear box equipment by being able to make a more accurate check of the condition of the oil therein and a determination of the fact of whether the oil has been overheated at anytime and as to how much. If there has been an overheating condition, more care will be taken by the mechanic on feeling out the oil and if there has been maximum overheating, there will be a clear reason for changing the oil.

While various changes may be made in the detail construction, it shall be understood that such changes shall be within the spirit and scope of the present invention as defined by the appended claims.

What is claimed:

1. A threaded temperature indicating oil plug for use with hot oil housings such as vehicle transmissions and the like and adapted to replace standard oil level plugs thereof, including a threaded shank portion for securement to the housing having an elongated curved surface reduced diameter portion extended axially therefrom for contact with oil therein and a paper label having a series of crystal-like temperature areas respectively responsive to different temperatures of hot oil within the housing and wrapped about the curved surface of the elongated axial extending portion.

2. A threaded temperature indicating oil plug for use with hot oil housings such as vehicle transmissions and the like and adapted to replace standard oil level plugs thereof as defined in claim 1 and a releasable transparent sleeve enclosure extending about the paper label to secure the same in a liquid tight manner upon oil plug.

3. A threaded temperature indicating oil plug for use with hot oil housings such as vehicle transmissions and the like and adapted to replace standard oil level plugs thereof as defined in claim 2 and said threaded shank portion providing a shoulder against which the sleeve enclosure engages, said reduced diameter axially-extending portion having a groove within its curved surface, said paper label being wrapped within the groove, said sleeve enclosure including a transparent sleeve and a releasable retaining plate secured to the end of the axial extending portion to retain the transparent sleeve against the threaded shank portion shoulder.

* * * * *